(12) United States Patent
Ongarato (10) Patent No.: US 12,282,768 B2
(45) Date of Patent: Apr. 22, 2025

(54) AUTOMATED DEVELOPER CONFIGURATION TOOL

(71) Applicant: ADP, Inc., Roseland, NJ (US)

(72) Inventor: Alex Ongarato, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 344 days.

(21) Appl. No.: 18/054,001

(22) Filed: Nov. 9, 2022

(65) Prior Publication Data
US 2024/0152356 A1 May 9, 2024

(51) Int. Cl.
*G06F 8/77* (2018.01)
*G06F 8/71* (2018.01)
*G06F 21/62* (2013.01)

(52) U.S. Cl.
CPC ............... *G06F 8/77* (2013.01); *G06F 8/71* (2013.01); *G06F 21/629* (2013.01)

(58) Field of Classification Search
CPC ............. G06F 8/71; G06F 8/77; G06F 21/629
See application file for complete search history.

(56) References Cited

U.S. PATENT DOCUMENTS

| | | | | |
|---|---|---|---|---|
| 7,815,100 B2* | 10/2010 | Adams | ............... | G06F 21/51 |
| | | | | 235/375 |
| 8,225,302 B2* | 7/2012 | Waugh | ............... | G06F 8/77 |
| | | | | 717/122 |
| 8,966,434 B2* | 2/2015 | Perisic | ............... | G06F 8/71 |
| | | | | 717/102 |
| 9,086,885 B2* | 7/2015 | Canter | ............... | G06F 8/34 |
| 9,454,363 B1* | 9/2016 | Angell | ............... | G06F 8/71 |
| 9,817,655 B1* | 11/2017 | Mandrika | ............... | G06F 8/71 |
| 9,940,219 B2* | 4/2018 | Bigwood | ............... | G06F 8/71 |
| 2006/0282479 A1* | 12/2006 | Johnson | ............... | G06F 8/65 |
| | | | | 707/999.203 |
| 2008/0066050 A1* | 3/2008 | Jain | ............... | G06F 11/3672 |
| | | | | 717/101 |
| 2010/0011060 A1* | 1/2010 | Hilterbrand | ............... | G06F 8/65 |
| | | | | 709/204 |
| 2013/0036400 A1* | 2/2013 | Bak | ............... | G06F 8/71 |
| | | | | 717/101 |
| 2015/0347093 A1* | 12/2015 | Dowd | ............... | G06F 8/71 |
| | | | | 717/101 |
| 2024/0061666 A1* | 2/2024 | Bregman | ............... | G06F 8/71 |

* cited by examiner

*Primary Examiner* — Douglas M Slachta
(74) *Attorney, Agent, or Firm* — Foley & Lardner LLP (57) ABSTRACT

Disclosed are various embodiments for an automated process for configuring a client device for software development in a particular development environment defined by an organization. In one example, a computing device is configured to configure a development environment associated with an organization on the computing device. A developer tool application associated with the organization can be downloaded. The computing device can modify a targeted application associated with the developer tool application and generate documentation for the targeted application based at least in part on the modification of the targeted application. An error assessment of a software upload can be performed. The software upload can be transmitted to a code repository based at least in part on the error assessment indicating that the software upload is compliant with an error configuration file.

20 Claims, 5 Drawing Sheets

AUTOMATED DEVELOPER CONFIGURATION TOOL

BACKGROUND

Software development can involve a team of developers working on various mobile applications, websites, and other software applications for a company. The company may have a software platform that is used both by internal development teams and development teams from third-party entities. The software platform may require a set of configuration settings and software tools for a developer to develop software code in the development platform.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The various embodiments of the present disclosure relate to an automated process for configuring a client device for software development in a particular development environment defined by an organization. When a new developer is brought onboard by a company, the developer can be given a set of instructions for configuring their client device. The client device may need to be configured in order to have the needed access to networked computing resources (e.g., restricted company data, restricted developer tools, restricted applications) and in order to configure the client device with a set of configuration settings. This set of instructions can be considered as an onboarding process for new employee developers and/or for third-party developers in order for the developers to be able to write, test, and execute programming code in a development environment defined the organization. In many instances, this onboarding process can be cumbersome and difficult to navigate. When issues arise with the onboarding process, the new developers have to seek help from other employees. In some scenarios, new developers can spend multiple days troubleshooting and configuring their client device for a particular development environment.

Various embodiments of the present disclosure are related to an automated process for configuring a client device for a software development environment defined by an entity. The software development environment can be defined by a set of configuration settings, networked computing resources, access privileges of networked computing resources, installed applications, and other suitable development components. The automated process can be an improved user experience by reducing the amount of the time spent onboarding a new client device (e.g., from days to minutes), automating remedial actions for correcting errors, logging modifications and configuration statuses of a device, and other suitable advantages. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1A:
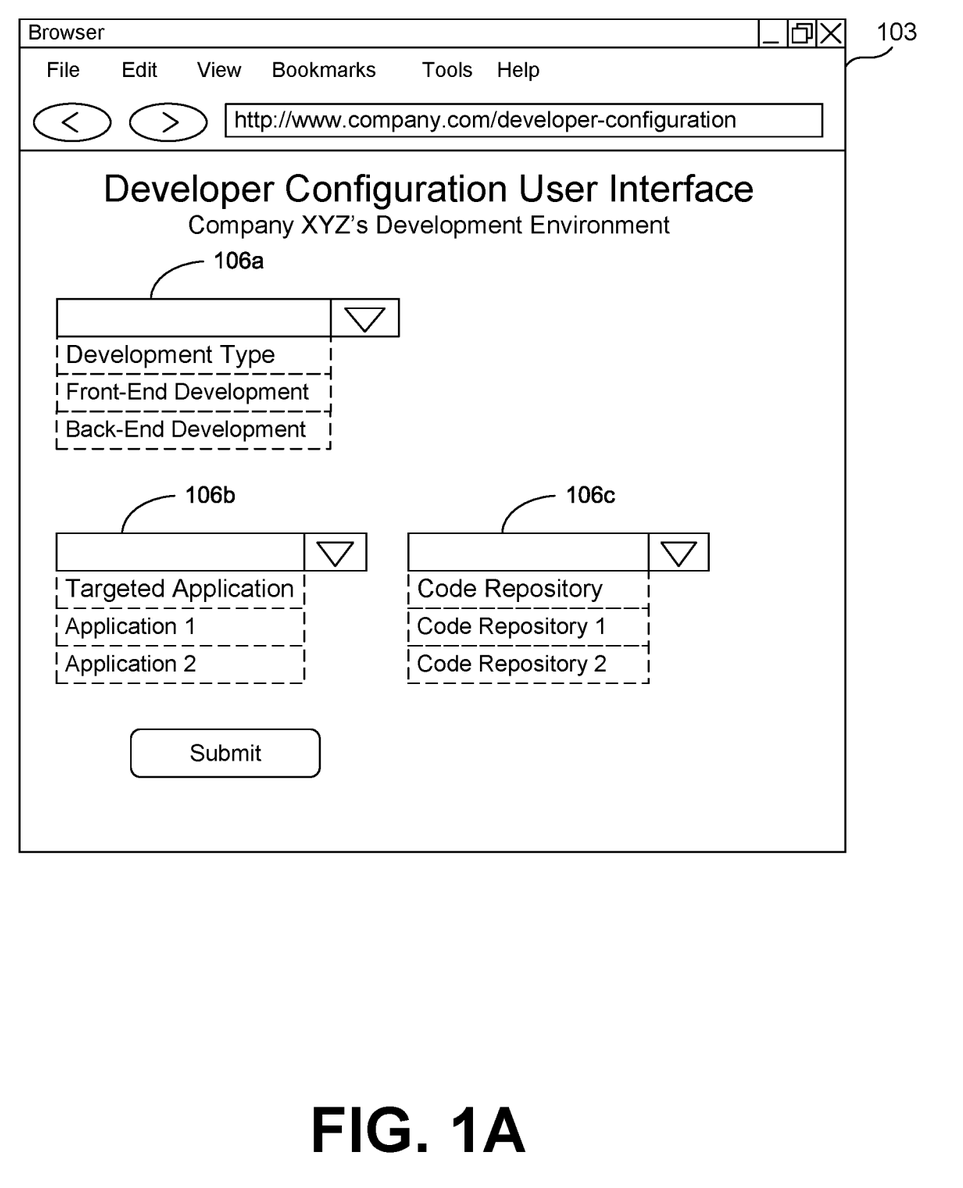
FIGS. 1A-1B are drawings depicting user interfaces of a configuration application according to several embodiments of the present disclosure.

As illustrated in FIG. 1A, shown is a user interface 103 for initiating a configuration application that automatically analyzes a compliance state of a client device for a development environment associated with an organization. If the client device is not in a compliant state, the configuration operation can execute actions to modify the state of the client device into a compliant state and/or provide instructions to the developer for certain aspects for bringing the state of client device into compliance for the development environment.

In FIG. 1A, the user interface 103 includes input components 106a-c for receiving an initial set of input parameters for initiating the configuration application. Input component 106a can represent a user interface component for the developer to select a type of software development. Input component 106b can represent selecting one or more targeted applications. The developer can write or test programming code for the targeted application after the client device has been configured for the development environment. Input component 106c can represent a selection of a code repository that will be used for generating software for the targeted application.

The configuration application can use the input parameters to select the appropriate configuration operation. The input parameters can be used to determine or generate a checklist of items that need to be assessed for a state of compliance with a development environment for the organization. For example, a front-developer will select that the front development option for input component 106a. The front developer may also select application 1 and code repository 1. After receiving these input parameters 106, the configuration application can generate a checklist of items to assess whether the client device is in a state of compliance. If not in compliance, the configuration application can modify certain aspects of the client device in order to comply with the state of compliance required for the front-end development for the organization. After the input components have been selected, the developer can select the "Submit" component and the configuration application can proceed to the configuration operation.

Figure 1B:
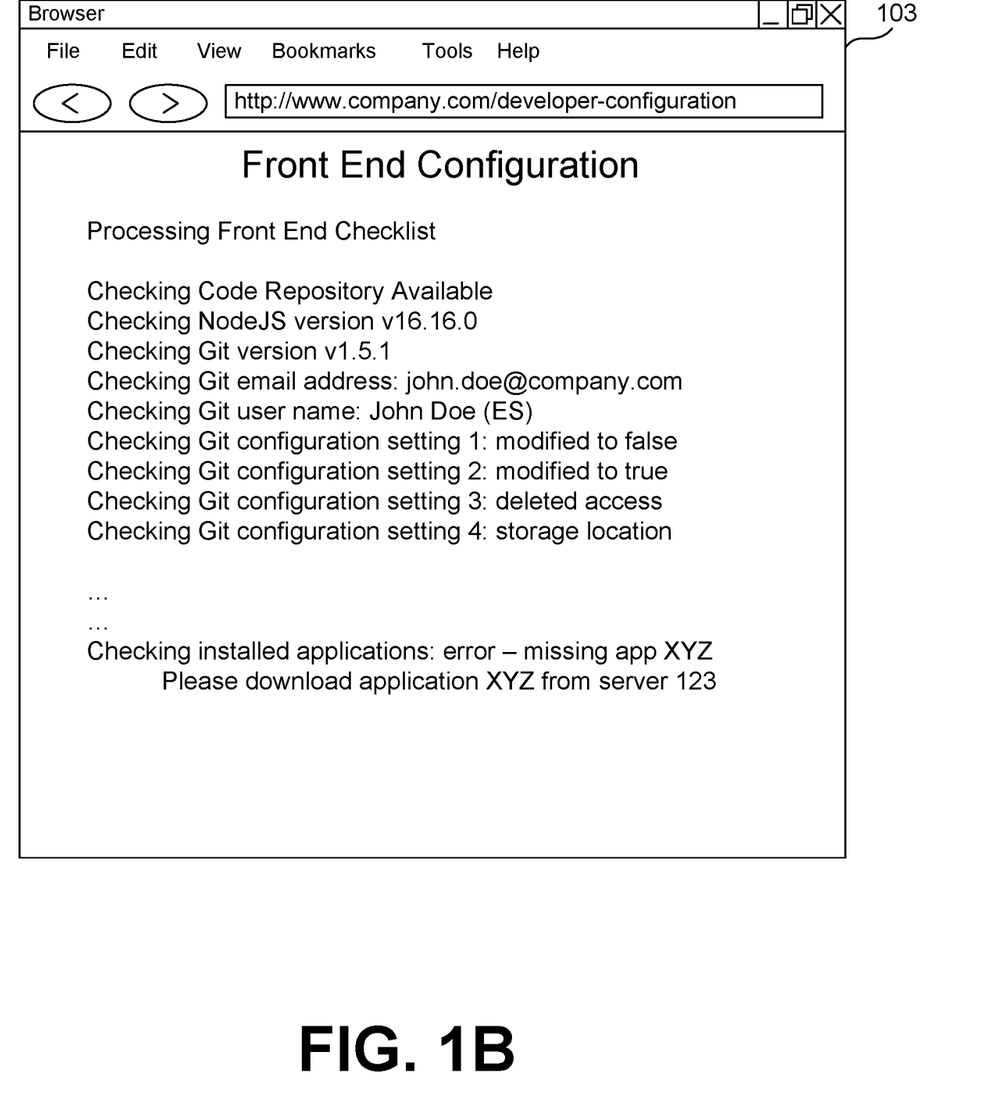

Next, FIG. 1B shows the user interface 103 has been updated to reflect a front-end development checklist that is in process for the client device. As shown in the user interface, various items are being assessed in the client device. In some instances, the configuration application is comparing a current configuration setting of the client device to a predefined compliant setting from the checklist. If the current configuration does not match the predefined compliant setting, then the configuration application can modify the configuration setting to a compliant state associated with from the checklist. In some cases, the configuration application makes a query to an operating system to retrieve the current configuration setting or other aspects associated with the client device.

For example, the configuration application can request the operating system provide a list of installed applications in the client device. As illustrated in the user interface, the configuration application identifies that "application XYZ" is missing from the client device. An error message is presented in the user interface to instruct the developer to download and install "application XYZ" from a particular server location.

Figure 2:
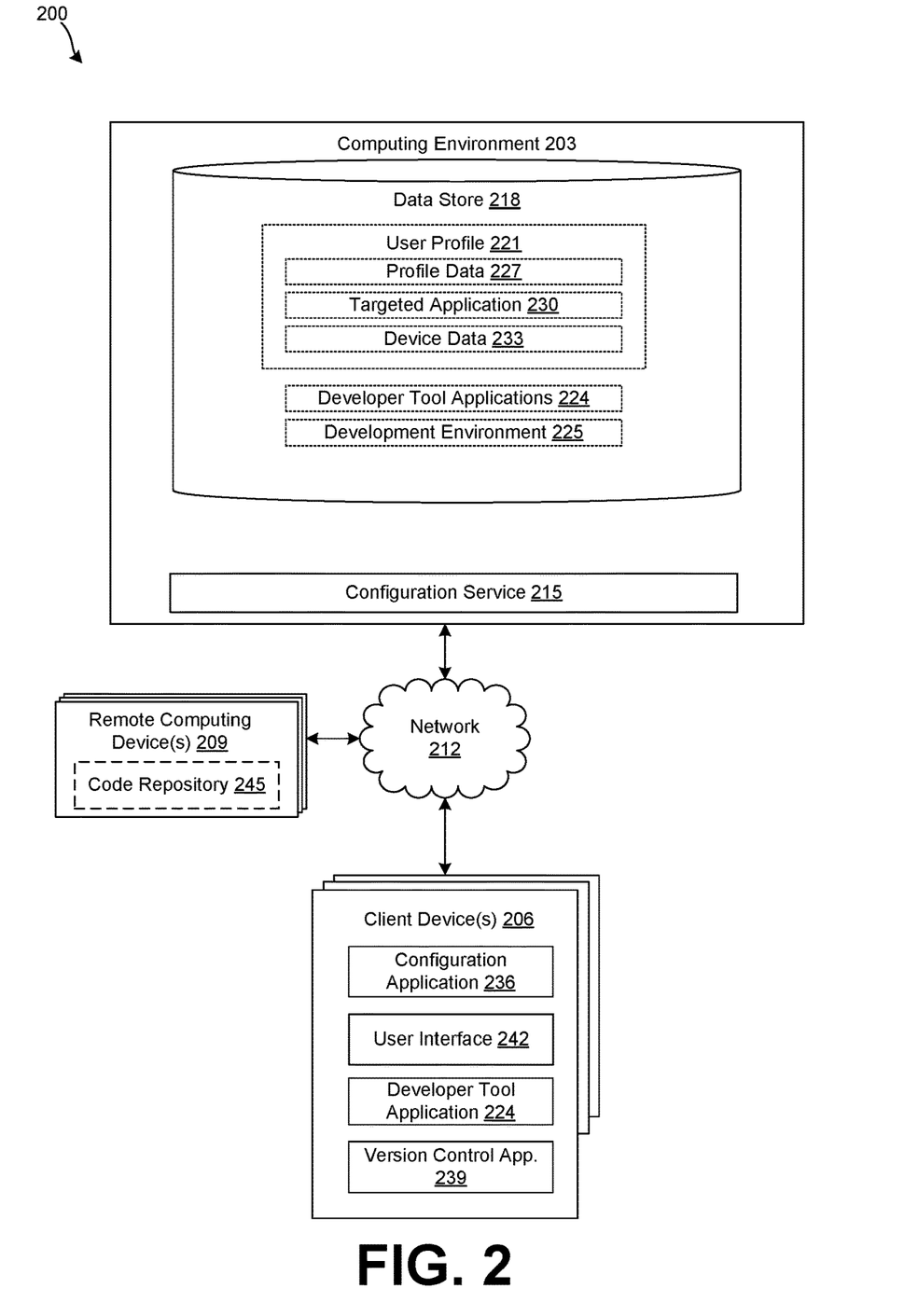
FIG. 2 is a drawing of a network environment according to various embodiments of the present disclosure.

With reference to FIG. 2, shown is a network environment 200 according to various embodiments. The network environment 200 can include a computing environment 203, a client device 206, and a remote computing device 209, which can be in data communication with each other via a network 212.

The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-Flo), BLUETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 include a configuration service 215, and other applications, services, processes, systems, engines, or functionality not discussed in detail herein. The configuration service 215 can be executed to facilitate configuring a client device 206 for a particular development environment associated with the organization.

Also, various data is stored in a data store 218 that is accessible to the computing environment 203. The data store 218 can be representative of a plurality of data stores 218, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 218 is associated with the operation of the various applications or functional entities described below. This data can include user profiles 221, developer tool applications 224, a development environment 225, and potentially other data.

The user profile 221 can represent data associated with a developer and device data associated with a client device 206 for the developer. The user profile 221 can include profile data 227, the targeted application 230, device data 233, and other suitable data. The profile data 227 can represent data associated with the developer, such as a job position (e.g., technical lead, manager, senior engineer, junior engineer, etc.), an employment status (e.g., employee, contractor, third-party developer, etc.), a geographic location of the developer, contact information (e.g., address, email address, phone number, etc.), and other suitable user profile data.

The targeted application 230 can represent one or more software applications that are written, tested, or executed in a development environment associated with the organization. In some instances, the targeted application 230 or software components of the targeted application 230 can be uploaded to the data store 218 or the remote computing device 209.

The device data 233 can represent data associated with the client device 206. Some non-limiting examples of device data 233 can include operating system data for the client device 206, configuration settings, a device identifier (e.g., client device serial number, Internet Protocol (IP) address, etc.), and other suitable data.

The development environment 225 can represent data associated with defining one or more software development environments for executing a targeted application 230, such as software testing environments, software evaluation environments, software execution environments, and other suitable software environments for developers. Some non-limiting examples of a development environment 225 can include Development Integrating Test (DIT), Functional Integration Testing, User Acceptance Testing, Integrating Acceptance Testing, production development, and other suitable software environments.

The client device 206 is representative of a plurality of client devices that can be coupled to the network 212. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 206 or can be connected to the client device 206 through a wired or wireless connection.

The client device 206 can be configured to execute various applications such as a configuration application 236, the developer tool application 224, a version control application 239, and other suitable applications. The configuration application 236 can be executed to configure the client device 206 of a developer for the development environment 225. The configuration of the client device 206 can include modifying one or more operating system settings, hardware resource settings, access privileges for networked resources (e.g., access code repositories, access restricted company data and applications), login credentials (e.g., username, email address, password, etc.), installing applications, modifying application settings, deleting applications, and other suitable actions. The one or more actions can be performed in order to bring the client device 206 to a state of compliance for a particular development environment. Once a state of compliance is reached, the developer can use the client device 206 to write, test, or execute software components of a targeted application. Further, the state of compliance for the development environment 225 can be defined in order to create a secure development environment 225.

Additionally, the configuration application 236 can be executed in a client device 206 to access network content served up by the computing environment 203 or other servers, thereby rendering a user interface 242 on the display. To this end, the configuration application 236 can include a browser, a dedicated application, or other executable, and the user interface 242 can include a network page, an application screen, or another user mechanism for obtaining user input. The client device 206 can be configured to execute applications beyond the configuration application 236 such as email applications, social networking applications, word processors, spreadsheets, or other applications.

The version control application 239 can be executed to manage versions of software that are developed on the client device 206. For example, the version control application 239 can maintain local versions of the targeted application 230. The version control application 239 can be in communication with the code repository of the remote computing device 209. In some examples, a software upload of the targeted application 230 can be uploaded to the remote computing device 209 and/or the computing environment 203. Non-limiting examples of a version control application 239 can include GIT®, MERCURIAL®, SUBVERSION®, CVS®, etc.

The remote computing device 209 can represent networked computing devices for maintaining a code repository 245. The code repository 245 can be used to store and organize one or more versions of a targeted application 230. The code repository 245 can be in communication with the version control application 239. Configuration settings for the version control application 239 may be modified in order to ensure that the code repository 245 can function with the version control application 239. In some embodiments, the remote computing device 209 is a third-party provider that is not associated with an organization of the computing environment 203. In other embodiments, the code repository 245 can be integrated into the computing environment 203. Some non-limiting examples of a code repository 245 can include GITHUB®, BITBUCKET®, and other suitable code repositories.

Next, a general description of the operation of the various components of the network environment 200 is provided. To begin, a developer may have recently been hired for a front-development programming position at a company. The company can provide a client device to the developer. In some instances, the configuration application 236 may be installed on the client device 206. In other scenarios, the developer may have to download the configuration application 236 from the computing environment 203.

Upon execution, the configuration application 236 can identify input parameters for a configuration operation associated with the developer. For example, the input parameters can indicate that the client device 206 needs to be configured for a development environment 225 associated with front-end applications. The configuration application 236 can proceed with a checklist of items for a front-end development environment 225. For example, the configuration application 236 can check one or more settings in the operating system of the client device 206, configuration settings for installed applications, access privileges for networked resources (e.g., code repositories, applications, restricted data), and other suitable development environment conditions.

In a user interface, the configuration application 236 can present the checklist of items as each item is being checked. The configuration application 236 can display an indication of whether each item on the checklist has been passed as compliant. If an item on the checklist is not compliant, then the configuration application 236 can modify the setting. The modification can be displayed in the user interface. In some scenarios, the configuration application 236 can display an error message that includes instructions for a remedial action. For example, the configuration application 236 may display an error of a missing application and instructions for downloading an appropriate version of the missing application.

After the checklist of items have been identified as compliant to a predefined state for a development environment 225, the configuration application 236 can download and install developer tool applications 224 for the development environment 225. Then, the configuration application 236 can configure a targeted application 230 for the development environment 225. The configuration of the targeted application 230 may include verifying whether certain software scripts are included, verifying one or more application settings, and other suitable conditions. For example, the configuration application 236 can identify a missing software script and insert the missing software script in the targeted application 230.

Next, the configuration application 236 can generate documentation related to the modifications made to the targeted application 230. The documentation may include instructions for operating the targeted application 230 based at least in part on the modifications. For example, the documentation may include command instructions and command parameters for the targeted application 230. In some embodiments, the documentation can be generated and appended to a readme.md file.

The configuration application 236 can perform an error assessment of a software upload for the targeted application 230. The error assessment can include identifying an upload checklist of items to evaluate the software upload. The error assessment can be used to identify potential coding errors before the software upload is provided to the code repository 245 or the computing environment 203. After the error assessment has been passed, then the configuration application 236 will permit the software upload to be transmitted to the code repository 245 or the computing environment 203.

Figure 3:
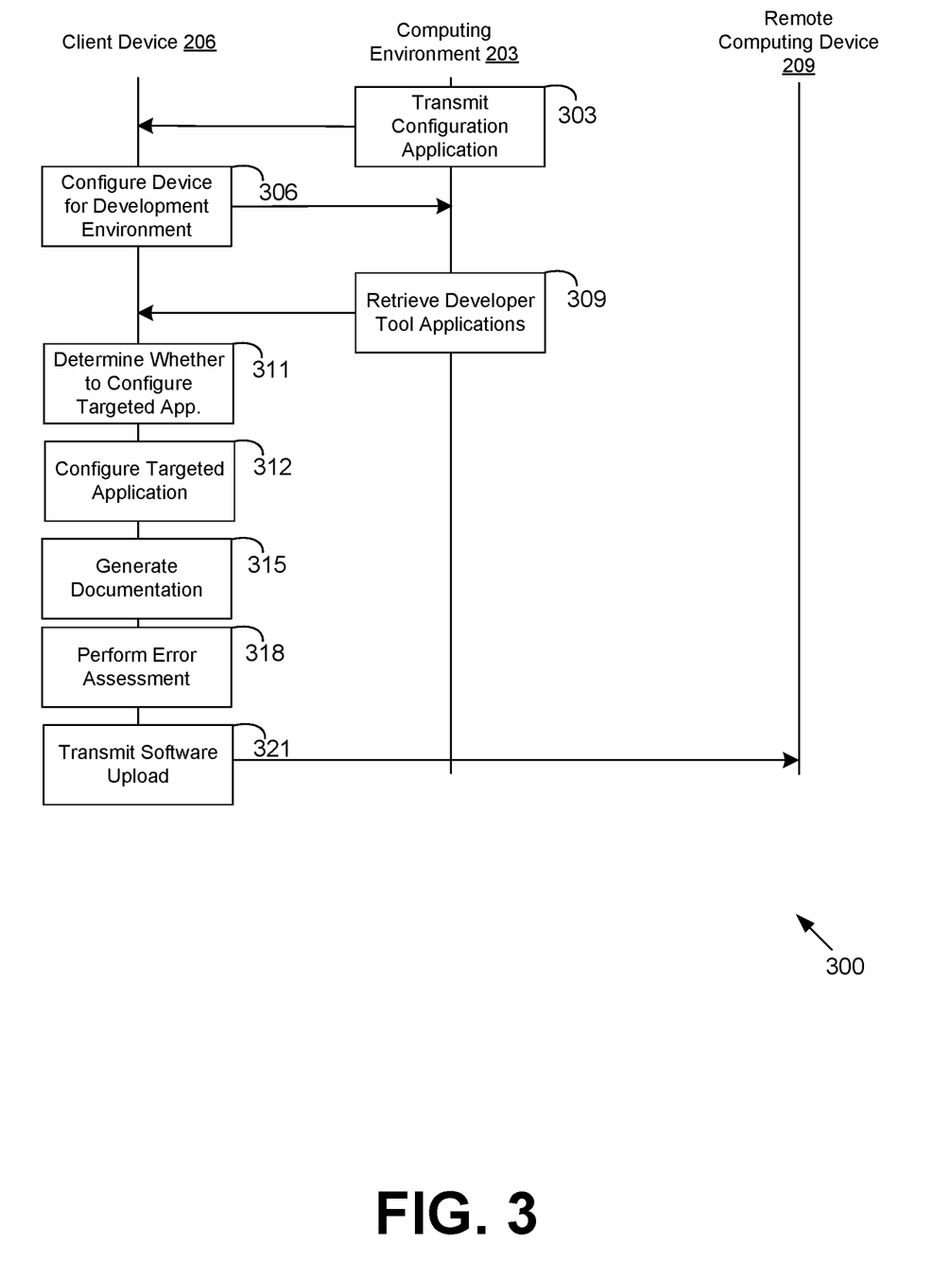
FIG. 3 is a sequence diagram for the network environment of FIG. 2 according to various embodiments of the present disclosure.

Referring next to FIG. 3, shown is a sequence diagram of operations performed in the network environment 200. It is understood that the sequence diagram of FIG. 3 provides merely an example of the many different types of interactions that can occur between the depicted components of the network environment 200. As an alternative, the sequence diagram of FIG. 3 may be viewed as depicting an example of elements of a method implemented in the network environment 200 (FIG. 2) according to one or more embodiments.

Beginning with box 303, the configuration service 215 (executed in the computing environment 203) can transmit the configuration application 236 to the client device 206 of a new developer employed by an organization or for a developer employed by a third-party entity. In some embodiments, the functionality of box 303 can be skipped or omitted. This could occur, for example, when the configuration application 236 has been installed on a client device 206 by Information Technology (IT) personnel of the organization.

In box 306, the configuration application 236 can configure a development environment 225 for the client device 206. The configuration application 236 can be set up to configure the client device 206 to be in compliance with one or more development environments 225 or development environment criteria. The development environments 225 can be defined by an organization or other individual or entity. In some embodiments, the configuration application 236 can used a configuration checklist of items specified by the organization in order for the client device 206 to be able to operate within the development environment 225.

In box 309, the configuration application 236 can retrieve one or more developer tool applications 224 from the configuration service 215 in the computing environment 203. In some embodiments, the configuration service 215 can transmit a set of developer tool applications 224 based at least in part on a request from the configuration application 236. In some instances, the request may include an indication that the client device 206 has been configured for the development environment 225. The indication can be a flag or other indicator that represents a completion of the configuration checklist of items. The indication informs the computing environment 203 (e.g., the configuration service 215) that the configuration application 236 is ready to proceed with the downloading one or more developer tool applications 224.

In box 311, the configuration application 236 can receive an indication of a targeted application 230 and can determine whether the targeted application 230 needs to be configured for the development environment 225 and/or the client device 206. In some instances, the configuration application 236 can provide an indication of the targeted application 230 that the developer will be working on in the development environment 225. In other instances, the configuration application 236 can receive a selection of the targeted application 230 from the user interface 242 (e.g., graphical user interface or a command line user interface).

In some embodiments, the configuration application 236 can determine whether the targeted application 230 needs to be modified based at least in part on a configuration file associated with the development environment 225. The configuration file can include a list of settings for the targeted application 230. If the targeted application 230 needs to be modified to comply with the configuration file, the configuration application 239 can proceed to box 312. In some embodiments, the configuration application 239 omits box 311 and proceeds to box 312.

In box 312, the configuration application 236 can configure the targeted application 230. In some embodiments, the configuration application 236 can add a software script to the targeted application 230, which will bring the targeted application 230 in compliance with the configuration file. In other instances, the configuration application 236 may modify an existing software script in the targeted application 230 in order for the targeted application 230 to be compliant.

In box 315, the configuration application 236 can generate documentation for the targeted application 230. In some embodiments, the generation of the documentation can include a description of the modification or other changes. For example, the description of the modification can be appended to an instruction file (e.g., a readme.md file) for the targeted application 230. The added description can include instructions on how to operate the targeted application 230 after the one or more modifications. Some of non-limiting examples of instructions can include a command instruction and command parameters for operating the command instruction.

In box 318, the configuration application 236 can receive an indication of a software upload (e.g., written code by the developer) for the targeted application 230 and the configuration application 236 can perform an error assessment of the software upload. The error assessment can include checking for potential errors in the software upload. The error assessment can be used to identify code issues before the software uploaded is transmitted to the code repository 245 or the computing environment 203. As such, the developer can take action to correct these potential errors before transmitting the software upload to another device.

The error assessment can evaluate an error checklist of software issues. The checklist can be defined by the organization. In some instances, the checklist may be selected among multiple checklists based at least in part on the development environment 225, the developer's position, or other suitable conditions. In some embodiments, a testing application can be used to perform the error assessment based at least in part on the checklist.

In box 321, the configuration application 236 can transmit the software upload to the code repository 245 and/or the computing environment 203. In some embodiments, the configuration application 236 can permit the transmission to the code repository or the computing environment 203 after an indication has been received that the error assessment has been passed by the software upload.

Figure 4:
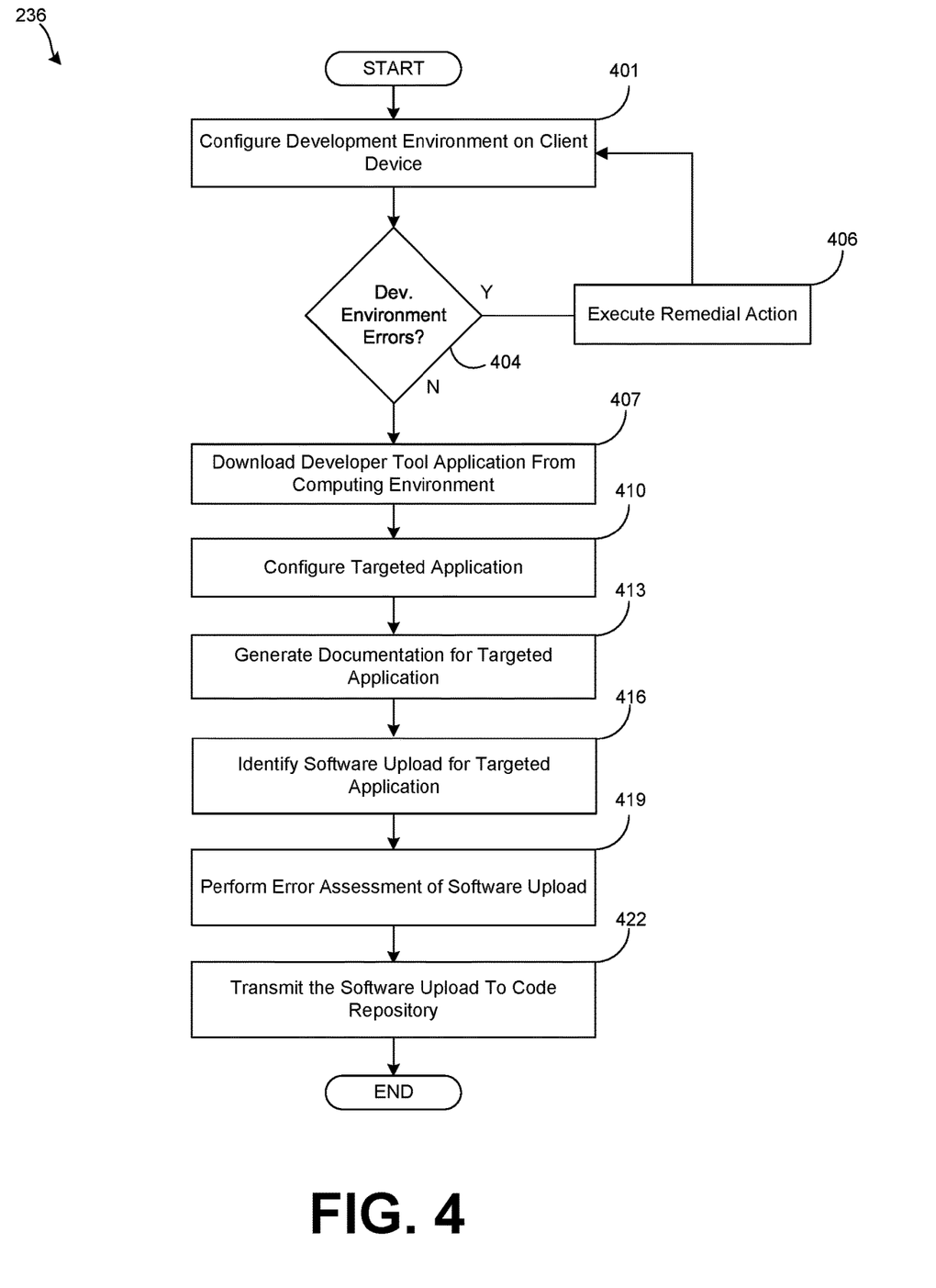
FIG. 4 is a flowchart illustrating one example of functionality implemented as portions of an application executed in a computing environment in the network environment of FIG. 2 according to various embodiments of the present disclosure.

Referring next to FIG. 4, shown is a flowchart that provides one example of the operation of a portion of the configuration application 236. The flowchart of FIG. 4 provides merely an example of the many different types of functional arrangements that can be employed to implement the operation of the depicted portion of the configuration application 236. As an alternative, the flowchart of FIG. 4 can be viewed as depicting an example of elements of a method implemented within the network environment 200.

Prior to the execution of the configuration application 236, a developer can download a configuration application 236 from the computing environment 203. The configuration application 236 can be executed to evaluate and modify, if needed, a current state of the client device 206 in order for the client device 206 to be in compliance with one or more development environments 225 or development criteria. The development environments 225 can be defined by an organization. As such, when a new developer is brought onboard for software development, the developer can first execute the configuration application 236.

Beginning with block 401, the configuration application 236 can configure a development environment 225 on the client device 206. The configuration application 236 can verify a checklist of configuration settings and other criteria to ensure the client device 206 is compliant with the development environment 225 defined by an organization. Some non-limiting examples of items or criteria on the checklist can include checking for one or more installed applications on the client device 206, the version number of the one or more installed applications, access privileges of the developer for networked resources in the computing environment 203 and/or in the remote computing device 209, email address of the developer, the IP address assigned to the client device 206, and other suitable configuration settings.

In some instances, the configuration application 236 can display a user interface 242 that is configured to receive one or more parameters from the developer. Some non-limiting examples of parameters received by the user interface 242 can include a developer role/position (e.g., front-end development, back-end development, etc.), targeted applications, and other suitable parameters.

In box 404, the configuration application 236 can determine whether there is an error while configuring the client device 206 for the development environment 225. The configuration application 236 can evaluate whether a present state of the client device 206 is compliant with a predefined checklist of items for the development environment 225, which can be defined by an organization. The present state of the client device 206 can be compared to the predefined checklist of items. The predefined checklist of lists can include items such as, for example, a compliant email address for network resources or applications, a list of installed applications, application settings, a version of the installed applications, a user name for the installed application, and other suitable conditions. The present state of the client device 206 can include the configuration application 236 requesting data from the operation system of the client device 206, data from installed applications on the client device 206, data from the remote computing device 209, data from the computing environment 203, and other suitable data sources. The data received from these various sources can be used to represent the present state of the client device 206.

As a non-limiting example, the configuration application 236 can request from the operating system of the client device 206 a list of installed applications. The list of installed applications can be compared to a predefined list of applications that are needed for the specified development environment 225. If an application on the predefined list is not installed, the configuration application 236 can retrieve and install the missing application on the client device 206 in one implementation.

In alternative implementations, the configuration application 236 can display an error message to the user interface 242. The error message can include an instruction for a remedial action. For instance, the instruction can include a message on where to retrieve the missing application and how to install the missing application.

As another example, the configuration application 236 can verify whether a stored email address used by an installed application (e.g., version control application) complies with an email standard defined by the organization. The email standard may be defined by the organization in order to ensure compatibility with networked resources associated with the computing environment 203. If an error has been detected, the configuration application 236 proceed to box 406.

In box 406, the configuration application 236 can execute a remedial action for the error identified during the configuration of the development environment 225. Each item on the predefined checklist of items can have a different process for a modification or a correction associated with the error. In some examples, the remedial action can include modifying a configuration setting associated with the operating system of client device 206, modifying a configuration setting for an application installed in the client device 206, installing a missing application, modifying an email address setting, and other suitable scenarios. After the remedial action has been executed by the client device 206 or performed by the developer, the configuration application 236 can proceed back to box 401 to either continue processing the predefined checklist of items or resume the processing the predefined checklist of items.

In some implementations, the configuration application 236 can process the entire checklist of items and display one or more errors. If an error is displayed in the user interface after the entire checklist of items has been processed, the configuration application 236 can reprocess the configuration checklist of item after a remedial action has been performed. After the entire checklist of items has been evaluated and passed as compliant, then the configuration application 236 can proceed to box 407.

In box 407, the configuration application 236 can retrieve or download one or more developer tool applications 224 from the computing environment 203 or from another suitable computing resource. The configuration application 236 can determine which developer tool applications 224 should be retrieved for the client device 206. In some embodiments, the developer tool application 224 can select the developer tool applications 224 for retrieval based at least in part on the parameters provided by the user. For example, if the developer indicated that their developer position is a front-end developer position, the configuration application 236 would retrieve and install developer tool applications 224 associated with front-end development. As such, a different set of developer tool applications 224 can be downloaded and installed for a back-end developer position.

In box 410, the configuration application 236 can configure a targeted application 230. The configuration application 236 can an indication of a targeted application 230 that will be developer will be working on in the development environment 225. The configuration application 236 can receive the specification of the targeted application 230 from the user interface 242 (e.g., graphical user interface or a command line user interface). For example, the targeted application 230 can be specified as a uniform resource locator (URL), in which the targeted application 230 can be located in either the remote computing device 209, in the computing environment 203, or other suitable locations. In some implementations, the configuration application 236 can verify the specified targeted application 236 and display in the user interface 242 that the targeted application 236 has been verified.

In some examples, the targeted application 236 is specified prior to downloading the developer tool applications 224. In these examples, the specified targeted application 236 can be used as another condition to determine which developer tool applications 224 are required for the client device 206.

The configuration application 236 can evaluate whether the targeted application 230 needs to be configured for the development environment 225 and/or the client device 206. In some embodiments, the configuration application 236 can determine whether the targeted application 230 needs to be modified based at least in part on a configuration file associated with the development environment 225. The configuration file can include a list of settings for the targeted application 230. If the targeted application 230 needs to be modified to be compliant with the configuration file, the configuration application 236 can add a software script to the targeted application 230, in which will bring the targeted application 230 in compliance with the configuration file. In other cases, the configuration application 236 can modify an existing software script for compliance.

In box 413, the configuration application 236 can generate documentation for the targeted application 230. In some embodiments, the generation of the documentation can include a description of the modification or other changes. For example, the description of the modification can be appended to an instructional user file (e.g., readme.md file) for the targeted application 230. The added description can include instructions on how to operate the targeted application 230 after the modification. Some non-limiting examples of instructions can include a command instruction and command parameters for operating the command instruction. In some instances, the documentation can be displayed in the user interface 242.

A list of predefined instructions can be prepared and associated with each potential modification for a targeted application. As such, if modification A is made, then the configuration application 236 retrieves and inserts description A for the targeted application in the readme.md file. If modification B is made, then the configuration application can retrieve and insert description B for targeted application 230 in the readme.md file.

In box 416, the configuration application 236 can identify a software upload (e.g., written code by the developer) for the targeted application. The software upload can be identified based at least in part on a receiving an indication of the software upload from the user interface 242. The indication can represent the developer desires to transmit the software upload to the code repository 245 and/or the computing environment 203. The developer can provide the indication through a user interface (e.g., graphical user interface or a command line interface), in which the user interface can receive an indication of the targeted application 230 and the location of the software upload for the targeted application 230.

In box 419, the configuration application 236 can perform an error assessment of the software upload. The error assessment can include checking for potential errors in the software upload. The error assessment is intended to identify code issues for the developer to repair before the software upload is transmitted to the code repository 245 or the computing environment 203.

The error assessment can involve evaluating an error checklist of software issues. The error checklist can be defined by the organization. In some instances, the checklist may be selected among multiple checklists based at least in part on the development environment 225, the developer's position, or other suitable conditions. In some embodiments, a testing application can be used to perform the error assessment based at least in part on the checklist.

In some embodiments, the configuration application 236 can display an error message that indicates an aspect of the software upload has failed the error assessment. After the developer has remedied the failure, the configuration application 236 can reprocess the error checklist of software issues. If the configuration application 236 completes the entire checklists of software issues with no failures, then the configuration application 236 can proceed to box 422.

In box 422, the configuration application 236 can transmit the software upload to the code repository 245 and/or the computing environment 203. In some embodiments, the configuration application 236 can permit the transmission to the code repository or the computing environment 203 after an indication has been received that the error assessment has been passed by the software upload.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 and sequence diagram of FIG. 3 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowchart of FIG. 4 and sequence diagram of FIG. 3 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowchart of FIG. 4 and sequence diagram of FIG. 3 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
configure a development environment associated with an organization entity on the computing device based at least in part on an assessment of a list of installed applications and a list of configuration settings for the computing device;
download a developer tool application associated with the organization entity;
modify a targeted application associated with the developer tool application based at least in part on a configuration file associated with the development environment;
generate documentation for the targeted application based at least in part on the modification of the targeted application;
perform an error assessment of a software upload based at least in part on an error configuration file based at least in part on an upload request for the software upload; and
transmit the software upload to a code repository based at least in part on the error assessment indicating that the software upload is compliant with the error configuration file.

2. The system of claim 1, wherein the assessment of the list of installed applications and the list of configuration settings for the computing device further cause the computing device to at least:
determine that the list of installed applications is not compliant for the development environment based at least in part on a comparison between the list of installed applications to a predefined list of applications for the development environment associated with the organization entity; and display an error message that includes a remedial instruction based at least in part on the list of installed applications not being compliant for the development environment.

3. The system of claim 2, wherein the comparison between the list of installed applications to the predefined list of applications for the development environment associated with the organization entity further causes the computing device to at least:
compare a first version of a particular application from the list of installed applications to a second version associated with the predefined list of applications.

4. The system of claim 1, wherein the assessment of the list of installed applications and the list of configuration settings for the computing device further cause the computing device to at least:
determine that an access privilege for a version control application installed on the computing device is not compliant for the development environment; and
modify the access privilege to comply with a configuration setting associated with the development environment.

5. The system of claim 1, wherein the modification of the targeted application associated with the developer tool application further causes the computing device to at least:
add a configuration script to the targeted application in order for the targeted application to be executed with the developer tool application.

6. The system of claim 1, wherein the documentation comprises a text description of an instruction for operating a command for the targeted application, and the text description is appended to a documentation file for the targeted application.

7. The system of claim 1, wherein the assessment of the list of installed applications and the list of configuration settings for the computing device further cause the computing device to at least:
determine that the computing device has an access privilege for a remote computing device that is compliant with a predefined configuration setting, the remote computing device hosting the code repository.

8. A method, comprising:
configuring, by a client device, a development environment associated with an organization entity on the client device by assessing a list of installed applications and a list of configuration settings for the client device;
retrieving, by the client device, a developer tool application associated with the organization entity, the developer tool application being configured to operate with the development environment;
modifying, by the client device, a targeted application associated with the developer tool application based at least in part on a configuration file associated with the development environment; and
generating, by the client device, documentation for the targeted application based at least in part on the configuration of the targeted application, the documentation includes a text description for the modification of the targeted application.

9. The method of claim 8, further comprising:
receiving, by the client device, an indication of a software upload associated with the targeted application;
performing, by the client device, an error assessment of the software upload based at least in part on an error configuration file; and
transmitting, by the client device, the software upload to a remote computing device based at least in part on the error assessment indicating that the software upload is compliant with the error configuration file, the remote computing device managing a code repository for the targeted application.

10. The method of claim 8, wherein assessing the list of installed applications and the list of configuration settings for the client device further comprise:
determining, by the client device, that the list of installed applications is not compliant for the development environment based at least in part on a comparison between the list of installed applications to a predefined list of applications for the development environment associated with the organization entity; and
displaying, by the client device, an error message that includes a remedial instruction based at least in part on the list of installed applications not being compliant for the development environment.

11. The method of claim 10, wherein the comparison between the list of installed applications to the predefined list of applications for the development environment associated with the organization entity further comprises:
comparing a first version of a particular application from the list of installed applications to a second version associated with the predefined list of applications.

12. The method of claim 8, wherein assessing the list of installed applications and the list of configuration settings for the client device further comprise:
determining an access privilege for a version control application installed on the client device is not compliant for the development environment; and
modifying the access privilege to comply with a configuration setting associated with the development environment.

13. The method of claim 8, wherein modifying the targeted application associated with the developer tool application further comprising:
modifying, by the client device, a configuration script in the targeted application in order for the targeted application to be executed with the developer tool application.

14. The method of claim 8, wherein assessing the list of installed applications and the list of configuration settings for the client device further comprise:
determining the client device has an access privilege for a remote computing device that is compliant with a predefined configuration setting associated with the development environment.

15. A non-transitory, computer-readable medium, comprising machine-readable instructions that, when executed by a processor of a computing device, cause the computing device to at least:
configure a development environment associated with an organization entity on the computing device based at least in part on an assessment of a list of installed applications and a list of configuration settings for the computing device;
retrieve a developer tool application associated with the organization entity;
configure a targeted application associated with the developer tool application based at least in part on a configuration file associated with the development environment;
receive an indication of a software upload associated with the targeted application;

perform an error assessment of the software upload based at least in part on an error configuration file based at least in part on an upload request for the software upload; and transmit the software upload to a code repository of a remote computing device based at least in part on the error assessment indicating that the software upload is compliant with the error configuration file.

16. The non-transitory, computer-readable medium of claim 15, wherein the machine-readable instructions, when executed by the processor, cause the computing device to at least:

determine that the list of installed applications is not compliant for the development environment based at least in part on a comparison between the list of installed applications to a predefined list of applications for the development environment associated with the organization entity; and display an error message that includes a remedial instruction based at least in part on the list of installed applications not being compliant for the development environment.

17. The non-transitory, computer-readable medium of claim 16, wherein the comparison between the list of installed applications to the predefined list of applications for the development environment associated with the organization entity further causes the computing device to at least:

compare a first version of a particular application from the list of installed applications to a second version associated with the predefined list of applications.

18. The non-transitory, computer-readable medium of claim 15, wherein the assessment of the list of installed applications and the list of configuration settings for the computing device further cause the computing device to at least:

determine that an access privilege for a version control application installed on the computing device is not compliant for the development environment; and modify the access privilege to comply with a configuration setting associated with the development environment.

19. The non-transitory, computer-readable medium of claim 15, wherein the configuration of the targeted application associated with the developer tool application further causes the computing device to at least:

add a configuration script to the targeted application in order for the targeted application to be executed with the developer tool application.

20. The non-transitory, computer-readable medium of claim 15, wherein the machine-readable instructions, when executed by the processor, cause the computing device to at least:

generate documentation for the targeted application based at least in part on the configuration of the targeted application, the documentation includes a text description for a modification for the targeted application.

* * * * *